(12) United States Patent
Sakaguchi (10) Patent No.: US 9,884,565 B2
(45) Date of Patent: Feb. 6, 2018

(54) ELECTRIC VEHICLE

(71) Applicant: MITSUBISHI JIDOSHA KOGYO KABUSHIKI KAISHA, Tokyo (JP)

(72) Inventor: Yoshihiro Sakaguchi, Okazaki (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 238 days.

(21) Appl. No.: 14/964,045

(22) Filed: Dec. 9, 2015

(65) Prior Publication Data

US 2016/0185247 A1 Jun. 30, 2016

(30) Foreign Application Priority Data

Dec. 25, 2014 (JP) .................................. 2014-263061

(51) Int. Cl.
*B60L 11/18* (2006.01)
*B60L 3/00* (2006.01)
(Continued)

(52) U.S. Cl.
CPC ........... *B60L 11/1861* (2013.01); *B60L 3/003* (2013.01); *B60L 3/0023* (2013.01); *B60L 11/08* (2013.01); *B60L 11/123* (2013.01); *B60L 11/14* (2013.01); *B60L 11/1803* (2013.01); *B60L 15/20* (2013.01); *B60W 20/10* (2013.01); *B60W 20/15* (2016.01); *B60L 2240/525* (2013.01); *B60L 2260/28* (2013.01); *Y02T 10/6217* (2013.01);
(Continued)

(58) Field of Classification Search
CPC .. Y02T 10/72; Y02T 10/6216; Y02T 10/7275
See application file for complete search history.

(56) References Cited

U.S. PATENT DOCUMENTS

| 2005/0173179 A1 | 8/2005 | Amanuma et al. |
| 2013/0066498 A1 | 3/2013 | Nissato |
| 2013/0187446 A1 | 7/2013 | Ferrel et al. |

FOREIGN PATENT DOCUMENTS

| CN | 102666234 A | 9/2012 |
| CN | 103072484 A | 5/2013 |

(Continued)

OTHER PUBLICATIONS

Extended European Search Report dated May 23, 2016 for the corresponding European Patent Application No. 15 201 662.2.
(Continued)

*Primary Examiner* — Robert Deberadinis
(74) *Attorney, Agent, or Firm* — Birch, Stewart, Kolasch & Birch, LLP (57) ABSTRACT

An electric vehicle includes: a high-voltage battery; a generator for generating electric power having a voltage higher than a battery voltage of high-voltage the battery; a first electric motor driven by electric power having a generation voltage of the generator; a second electric motor driven by electric power having the battery voltage of the high-voltage battery; a transformer for reducing a voltage of a part of the electric power generated by the generator which is to be distributed to the high-voltage battery from the generation voltage of the generator to the battery voltage of the high-voltage battery; and a controller for reducing a distribution ratio of the electric power to be distributed to the second electric motor from the generator if the temperature of the transformer is determined to have increased to reach a first predetermined temperature or higher.

16 Claims, 5 Drawing Sheets

(51) Int. Cl.
*B60L 11/12* (2006.01)
*B60L 11/14* (2006.01)
*B60L 15/20* (2006.01)
*B60W 20/10* (2016.01)
*B60W 20/15* (2016.01)
*B60L 11/08* (2006.01)

(52) U.S. Cl.
CPC .......... *Y02T 10/645* (2013.01); *Y02T 10/7005* (2013.01); *Y02T 10/7077* (2013.01); *Y02T 10/72* (2013.01); *Y02T 10/7275* (2013.01)

(56) References Cited

FOREIGN PATENT DOCUMENTS

| | | |
|---|---|---|
| CN | 103213503 A | 7/2013 |
| EP | 2 517 938 A1 | 10/2012 |
| JP | 4956800 B2 | 6/2012 |

OTHER PUBLICATIONS

Office Action dated Jul. 19, 2017 issued to the corresponding CN Application No. 201510988446.4 with an English Translation.

ELECTRIC VEHICLE

TECHNICAL FIELD

The present invention relates to an electric vehicle of four-wheel drive including the first electric motor driven by electric power of a voltage higher than the battery voltage of a high-voltage battery, and the second electric motor driven by electric power of the battery voltage of the high-voltage battery.

BACKGROUND

There is a disclosure of an electric vehicle including a unit for detecting a temperature of an electric motor, a temperature-estimation unit for estimating a temperature of an electric motor after detection on the basis of the detected temperature of the electric motor, and a driving-force control unit for estimating an increase rate of the temperature of the electric motor if the detected temperature of the electric motor is greater than an upper limit of a recommended temperature range and correcting a driving force of wheels driven by the electric motor with a temperature exceeding an allowable temperature to a decreasing side if the temperature is greater than an upper limit of the allowable temperature (see, for instance, Japanese Patent No. 4956800, which is Patent Document 1).

Further, widely known is an electric vehicle including a high-voltage battery for storing electric power for driving the electric vehicle, a generator for generating electric power having a voltage higher than the battery voltage of the high-voltage battery, the first electric motor disposed next to the generator and driven by electric power of the generation voltage of the generator, and a transformer for increasing a voltage of the battery voltage of the high-voltage battery to the generation voltage.

Such an electric vehicle is a two-wheel drive (2WD). For an electric vehicle of four-wheel drive (4WD), it is desirable to provide the second electric motor driven by electric power of the battery voltage of the high-voltage battery to drive the other two wheels, from the perspective of restricting cost and weight. In a case where the second electric motor is provided to drive the other two wheels, the electric power generated by the generator flows through the transformer to have the voltage decreased from the generation voltage to the battery voltage, and is supplied to the second electric motor.

SUMMARY

However, the maximum output and the rated continuous output are limited for a transformer. When a high output is required, such as when a vehicle is climbing at a high speed, the output may exceed the rated continuous output, and eventually the temperature of the transformer may exceed the upper limit temperature of the transformer if the high-speed climbing is continued. In such a case, the output of the transformer would be limited, and the traveling performance of the vehicle may not be maintained.

In view of the above issue, an object of the present invention is to provide an electric vehicle whereby it is possible to restrict the temperature of a transformer to an upper limit temperature of the transformer or lower, and to maintain the traveling performance of the vehicle.

The electric vehicle disclosed in Patent Document 1 (Japanese Patent No. 4956800) is of an independently-driven wheel type in which the wheels are independently driven by individual electric motors, and not of a type in which the battery voltage of a high-voltage battery is increased to drive an electric motor by electric power of a voltage higher than the battery voltage of the high-voltage battery.

In the present invention, an electric vehicle comprises a high-voltage battery for storing electric power for driving the electric vehicle, a generator for generating electric power having a voltage higher than a battery voltage of the high-voltage battery, a first electric motor disposed along with the generator and driven by electric power having a generation voltage of the generator, a second electric motor driven by electric power having the battery voltage of the high-voltage battery, a transformer for reducing a voltage of a part of the electric power generated by the generator which is to be distributed to the high-voltage battery from the generation voltage of the generator to the battery voltage of the battery, and a controller for reducing a distribution ratio of the electric power to be distributed to the second electric motor from the generator if the temperature of the transformer is determined to have increased to reach a first predetermined temperature or higher.

According to the present invention, the distribution ratio of electric power to be distributed to the second electric motor from the generator is reduced if the controller determines that the temperature of the transformer has increased to reach the first predetermined temperature or higher. Thus, the electric power that flows through the transformer decreases. In this way, the temperature of the transformer is restricted to the upper limit temperature of the transformer or lower, and it is possible to maintain the traveling performance of the vehicle.

In one aspect of the present invention, the controller includes a temperature determination unit which determines that the temperature of the transformer has increased to the first predetermined temperature or higher if the temperature of the transformer has increased to reach the first predetermined temperature or higher, or if an integrated value of electric current having flown through the transformer has increased to reach a predetermined electric-current value or higher within a monitoring period.

In this way, the temperature determination unit is capable of determining that the temperature of the transformer has increased to reach the first predetermined temperature or higher if the integrated value of electric current having flown through the transformer has increased to reach a predetermined electric-current value or higher within a monitoring period, even in a case where it is difficult to measure the temperature of the transformer.

In one aspect of the present embodiment, the controller includes a distribution-ratio control unit which reduces the distribution ratio of electric power to be distributed to the second electric motor with an increase in the temperature of the transformer, the temperature being at the first predetermined temperature or higher, or with an increase in the integrated value of electric current having flown through the transformer within a monitoring period, the integrated value being at or above the predetermined electric-current value.

In this way, when the temperature of the transformer is at or above the first predetermined temperature, the higher the temperature of the transformer is the more the distribution-ratio control unit reduces the distribution ratio of electric power to be distributed to the second electric motor. As a result, the temperature of the transformer is restricted efficiently, and it is possible to suppress a decrease in the vehicle performance efficiently.

In one aspect of the present invention, the distribution-ratio control unit increases the distribution ratio of the electric power to be distributed to the first electric motor in a case where the distribution ratio of the electric power to be distributed to the second electric motor is to be reduced.

Accordingly, the distribution-ratio control unit increases the distribution ratio of the electric power to be distributed to the first electric motor if the distribution ratio of the electric power to be distributed to the second electric motor is to be reduced. In this way, the temperature of the transformer is restricted efficiently, and the driving force of the first electric motor increases. As a result, there is a margin in the driving forces of the first electric motor and the second electric motor, and the operation can be switched from continuous high-load operation to high-output operation.

In one aspect of the present invention, the distribution-ratio control unit sets a distribution suppression gain of an electric motor related to the temperature of the transformer, and decreases the distribution ratio of the electric power to be distributed to the second electric motor on the basis of the distribution suppression gain.

In this way, the temperature of the transformer is restricted efficiently by a relatively simple control, and it is possible to maintain the traveling performance of the vehicle efficiently.

In one aspect of the present invention, the controller includes an output suppression control unit which suppresses the output of the transformer if the temperature of the transformer is determined to have increased to the second predetermined temperature or higher, the second predetermined temperature being higher than the first predetermined temperature.

In this way, the output suppression control unit suppresses the output of the transformer if the temperature of the transformer has increased to reach the second predetermined temperature or higher, the second predetermined temperature being higher than the first predetermined temperature. Thus, it is possible to protect the transformer from malfunction due to overheat.

In one aspect of the present invention, the output-suppression control unit sets an output suppression gain of the transformer related to the temperature of the transformer, and suppresses the output of the transformer on the basis of the output suppression gain.

In this way, the temperature of the transformer is restricted efficiently by a relatively simple control, and it is possible to protect the transformer from malfunction due to overheat efficiently.

In one aspect of the present invention, the transformer increases the voltage of the electric power to be distributed to the first electric motor from the battery voltage to the generation voltage in a case where the electric power stored in the high-voltage battery is to be distributed to the first electric motor and the second electric motor.

In this way, it is possible to drive the first electric motor by electric power stored in the high-voltage battery.

In one aspect of the present invention, the first electric motor is a front motor for driving front wheels, and the second electric motor is a rear motor for driving rear wheels.

In this way, the front motor is driven by electric power of a voltage higher than the battery voltage of the high-voltage battery, and the rear motor is driven by electric power maintained to have the battery voltage of the high-voltage battery. In this way, it is possible to drive the electric vehicle efficiently and safely.

As described above, according to the present invention, the temperature of the transformer is restricted to the upper limit temperature of the transformer or lower, and it is possible to maintain the traveling performance of the vehicle.

DETAILED DESCRIPTION

With reference to the accompanied drawings, an embodiment suitable to the electric vehicle of the present invention will be described. The present embodiment is not intended to limit the present invention, and all of the configurations described in the present embodiment are not necessarily required as a solution of the present invention.

Figure 1:
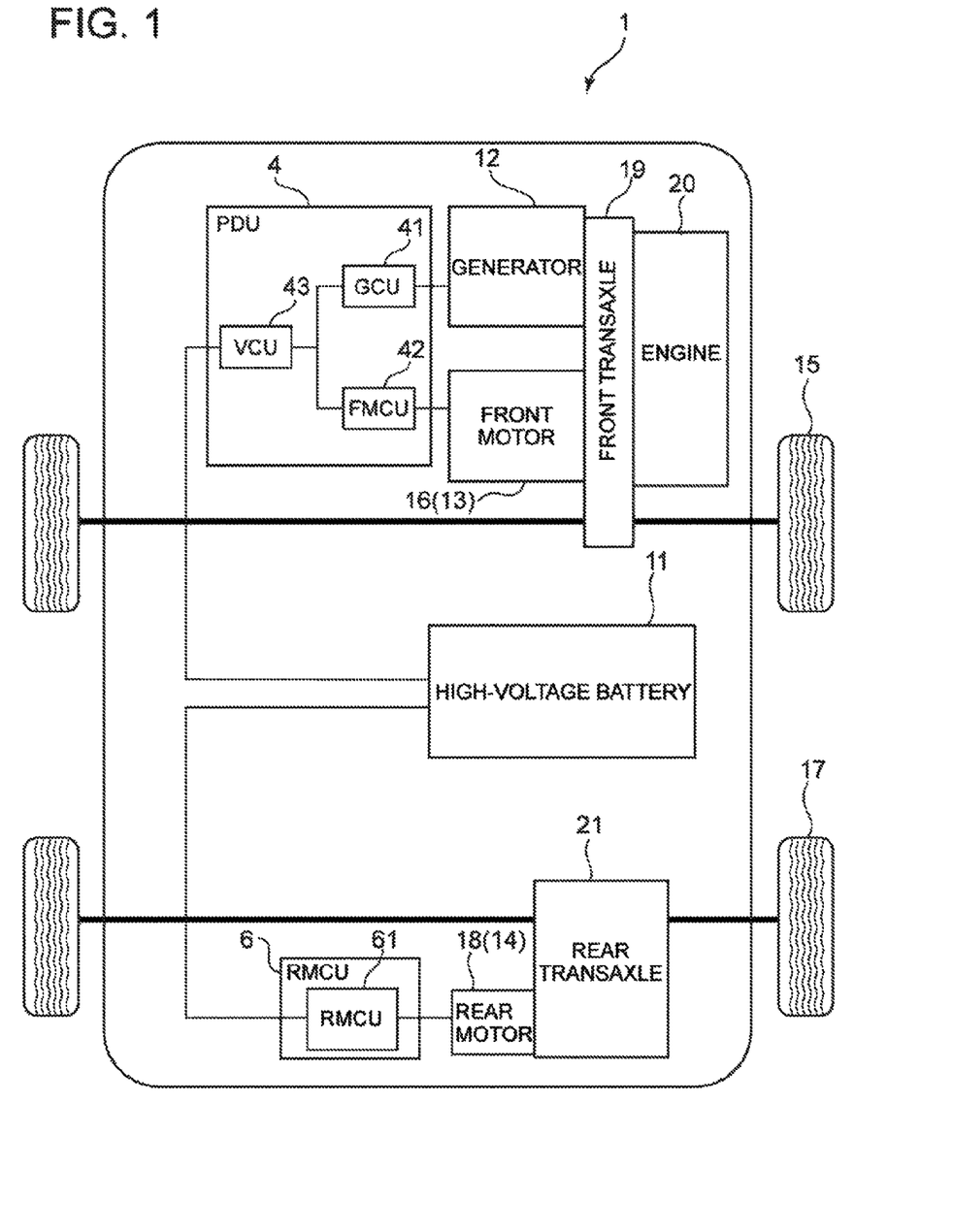
FIG. 1 is a block diagram illustrating the control configuration of an electric vehicle according to an embodiment of the present invention.
Figure 2:
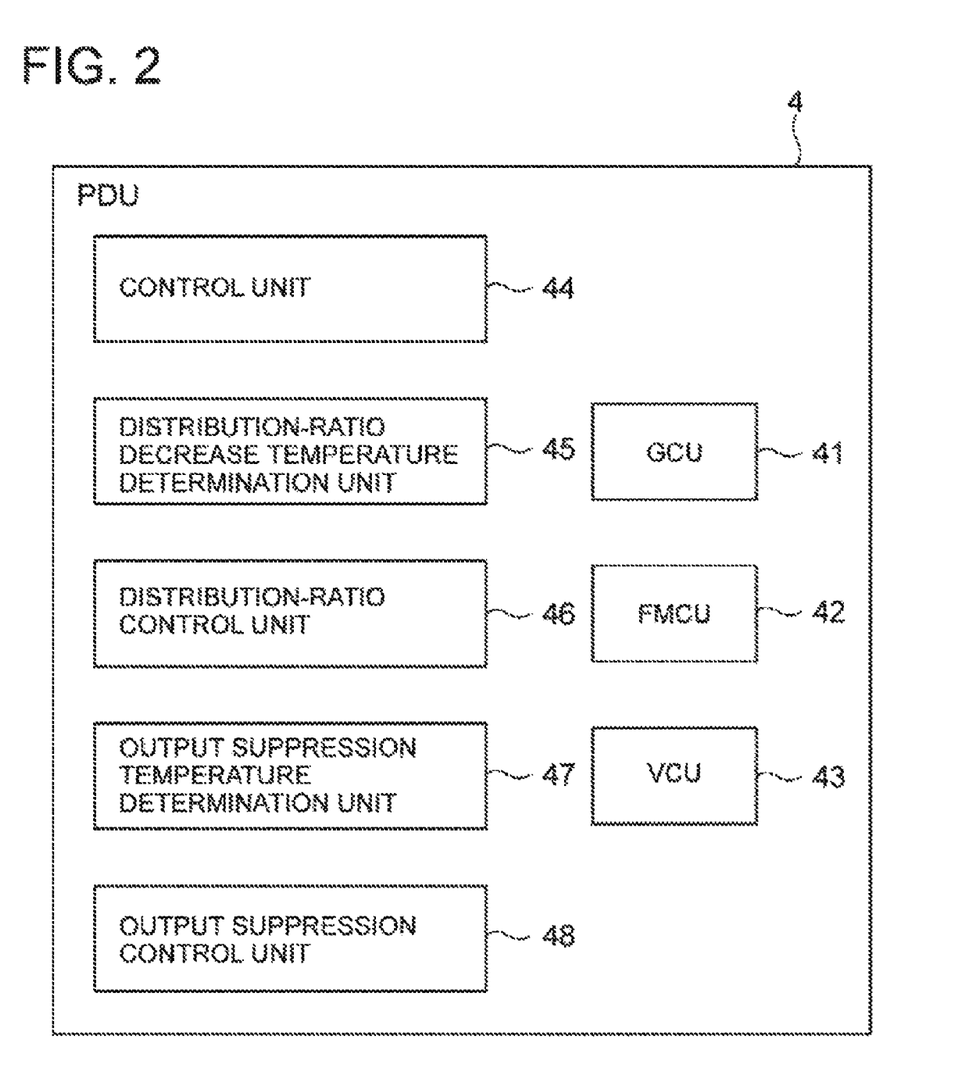
FIG. 2 is a block diagram illustrating the control configuration of a power drive unit illustrated in FIG. 1.

FIG. 1 is a block diagram illustrating the control configuration of an electric vehicle 1 according to an embodiment of the present invention, and FIG. 2 is a block diagram illustrating the control configuration of a power drive unit 4 illustrated in FIG. 1. As illustrated in FIG. 1, the electric vehicle 1 according to the embodiment of the present invention is an electric vehicle of four-wheel drive, and includes a high-voltage battery 11 which is a battery for storing electric power for driving the electric vehicle 1, a generator 12 for generating electric power having a voltage higher than the battery voltage of the high-voltage battery 11, the first electric motor 13 driven by electric power of the generation voltage of the generator 12, and the second electric motor 14 driven by electric power of the battery voltage of the high-voltage battery 11.

Thus, for instance, assuming that the battery voltage of the high-voltage battery 11 is 300V and the voltage of the electric power by which the first electric motor 13 is to be driven is 650V, the generation voltage of the generator 12 is 650V, and the voltage of the electric power that drives the second electric motor 14 is 300V.

The first electric motor 13 is a front motor 16 for driving front wheels 15, disposed on a front section of the electric vehicle 1 with the generator 12. The second electric motor 14 is a rear motor 18 for driving rear wheels 17, disposed on a rear section of the electric vehicle 1. The first electric motor 13 is not limited to the front motor 16 for driving the front wheels 15, and may be the rear motor 18 for driving the rear wheels 17. In a case where the first electric motor 13 is the rear motor 18 for driving the rear wheels 17, the second electric motor 14 is the front motor 16 for driving the front wheels.

As illustrated in FIG. 1, in the front section of the electric vehicle 1 on which the front motor 16 is disposed with the generator 12, a front transaxle 19 and an engine 20 are disposed, and in the rear section of the electric vehicle 1 on which the rear motor 18 is disposed, a rear transaxle 21 is disposed.

The front transaxle 19 integrally includes a transmission (not illustrated) and a differential gear (not illustrated), and is configured to transmit the power of the front motor 16 or the engine 20 to the front wheels 15 and to transmit the power of the engine 20 to the generator 12. In this way, the power of the front motor 16 or the engine 20 is transmitted to the front wheels 15 to drive the front wheels 15, while the power of the engine 20 is transmitted to the generator 12 to drive the generator 12.

Similarly to the front transaxle 19, the rear transaxle 21 integrally includes a transmission (not illustrated) and a differential gear (not illustrated), and is configured to transmit the power of the rear motor 18 to the rear wheels 17. In this way, the power of the rear motor 18 is transmitted to the rear wheels 17 to drive the rear wheels 17.

Further, as illustrated in FIG. 1, the electric vehicle 1 includes a power drive unit (PDU) 4 in the front section and a rear motor control unit (RMCU) 6 in the rear section.

The power drive unit 4 is a controller for controlling the generator 12 and the front motor 16, and includes a CPU (not illustrated) that executes various computing processes, an ROM (not illustrated) storing programs and data required to control the CPU, and a RAM (not illustrated) temporarily storing the computation result of the CPU, and input-output ports (not illustrated) for inputting and outputting signals with respect to outside, as well as a generator control unit 41 (hereinafter, referred to as GCU 41) that controls the generator 12, a front motor control unit 42 (hereinafter, referred to as FMCU 42) that controls the front motor 16, and a voltage control unit (transformer) 43 (hereinafter, referred to as VCU 43) for increasing or decreasing a voltage of electric power.

The GCU 41 and the FMCU 42 have a function of a power converter which includes a power circuit that electrically generates (inverts) alternate current (AC) from direct current (DC). The VCU 43 increases the voltage of DC stored in the high-voltage battery 11 and supplies the DC to the FMCU 42, and the FMCU 42 converts the electric power supplied from the VCU 43 into AC and supply the AC to the front motor 16. On the other hand, the GCU 41 converts the AC generated by the generator 12 and the AC recovered by the front motor 16 into DC, and supplies the DC to the VCU 43, and the VCU 43 reduces the voltage of the electric power supplied from the GCU 41 to supply the electric power to the high-voltage battery 11.

Further, as illustrated in FIG. 2, the power drive unit 4, i.e., the CPU, the ROM, and the RAM, include a control unit 44, a distribution-ratio decrease temperature determination unit 45 included in a temperature determination unit, a distribution-ratio control unit 46 which is a first control unit, an output suppression temperature determination unit 47 included in the temperature determination unit, and an output suppression control unit 48 which is a second control unit, and perform a centralized control on the GCU 41, the FMCU 42, and the VCU 43.

The control unit 44 controls the GCU 41, the FMCU 42, and the VCU 43 in accordance with various driving modes such as an EV mode, a parallel mode, and a series mode.

The EV mode is a driving mode in which the electric vehicle 1 is powered by only the electric power stored in the high-voltage battery 11. When the EV mode is selected, electric power (driving force) is distributed from the high-voltage battery 11 to the front motor 16 and the rear motor 18 at a predetermined ratio (e.g. 50:50). The electric power to be distributed to the front motor 16 has its voltage increased from the battery voltage of the high-voltage battery 11 to the generation voltage of the generator 12 by the VCU 43, and is supplied to the front motor 16. In this way, the front motor 16 is driven by electric power of a voltage (generation voltage) higher than the battery voltage of the high-voltage battery 11, and the rear motor 18 is driven by electric power maintained to have the battery voltage of the high-voltage battery 11.

The parallel mode is a driving mode in which the electric vehicle 1 is powered by the engine 20 and assisted by motors. When the parallel mode is selected, the engine 20 starts. Then, when a large output is required, such as when the electric vehicle 1 is overtaking, the front motor 16 and the rear motor 18 are activated, and the travel by the engine 20 is assisted by the front motor 16 and the rear motor 18.

The series mode is a driving mode in which the engine 20 generates electric power and the electric vehicle 1 runs by motors. When the series mode is selected, electric power (driving force) is distributed from the generator 12 to the front motor 16 and the rear motor 18 at a predetermined ratio (e.g. 50:50). The electric power to be distributed to the rear motor 18 has its voltage decreased from the generation voltage of the generator 12 to the battery voltage of the high-voltage battery 11 by the VCU 43, and is supplied to the rear motor 18. In this way, the front motor 16 is driven by electric power of the generation voltage of the generator 12, and the rear motor 18 is driven by electric power of a voltage (battery voltage) lower than the generation voltage of the generator 12.

The distribution-ratio decrease temperature determination unit 45 determines that the temperature of the VCU 43 has increased to reach the distribution-ratio decrease temperature T1 or higher, if the temperature of the VCU 43 has increased to reach the distribution-ratio decrease temperature (the first predetermined temperature) (set value) T1 (see FIGS. 3 and 6), or if an integrated value of electric current having flown through the VCU 43 has increased to reach a distribution-ratio decrease electric-current value (predetermined electric-current value) (set value) or higher within a monitoring period.

While it is preferable that the distribution-ratio decrease temperature determination unit 45 measures the temperature of the VCU 43 directly using a temperature sensor or the like, the integrated value of electric current having flown through the VCU 43 may be measured as described above.

The higher the temperature of the VCU 43 is, the temperature of the VCU 43 being at the distribution-ratio decrease temperature or higher, or the larger the integrated value of electric current having flown through the VCU 43 is within a monitoring period, the integrated value being at the distribution-ratio decrease electric-current value or higher, the more the distribution-ratio control unit 46 reduces the distribution ratio of electric power (driving force) to be distributed to the rear motor 18 (the second electric motor 14).

Figure 3:
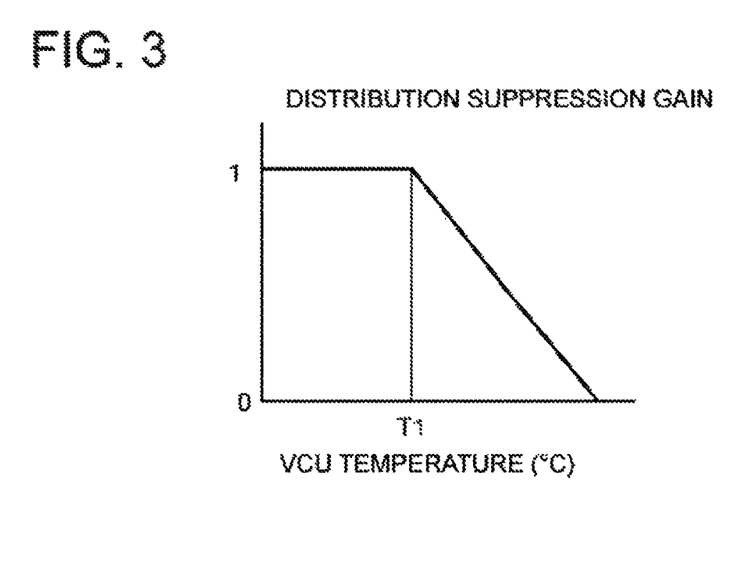
FIG. 3 is a diagram for explaining a distribution suppression gain.

Specifically, the distribution-ratio control unit 46 reduces the distribution ratio of electric power to be distributed to the rear motor 18 on the basis of a distribution suppression gain (see FIG. 3) stored in the ROM. The distribution suppression gain is set in relation to the temperature of the VCU 43, so that the distribution suppression gain decreases with an increase in the temperature of the VCU 43 when the temperature of the VCU 43 is at or above the distribution-ratio decrease temperature (T1), as illustrated in FIG. 3. In this way, when the temperature of the VCU 43 is at or above the distribution-ratio decrease temperature T1, the distribution ratio of electric power to be distributed to the rear motor 18 decreases with an increase in the temperature of the VCU 43.

Similarly to the distribution-ratio decrease temperature determination unit 45, the output suppression temperature determination unit 47 determines that the temperature of the VCU 43 has increased to reach the output suppression temperature or higher, if the temperature of the VCU 43 has increased to the output suppression temperature (the second predetermined temperature) (set value) T2 (see FIGS. 4 and 6), or if the integrated value of electric current having flown through the VCU 43 has increased to an output suppression electric-current value (set value) or higher within a monitoring period.

Similarly to the distribution-ratio decrease temperature determination unit 45, while it is preferable that the output suppression temperature determination unit 47 measures the temperature of the VCU 43 directly using a temperature sensor or the like, the integrated value of electric current having flown through the VCU 43 may be measured, as described above.

The higher the temperature of the VCU 43 is, the temperature of the VCU 43 being at or above the output suppression temperature (set value) T2 higher than the distribution-ratio decrease temperature, or the larger the integrated value of electric current having flown through the VCU 43 is within a monitoring period, the integrated value of electric current being at or above the output suppression electric-current value (set value) larger than the distribution-ratio decrease electric-current value, the more the output suppression control unit 48 reduces the output of the VCU 43.

Figure 4:
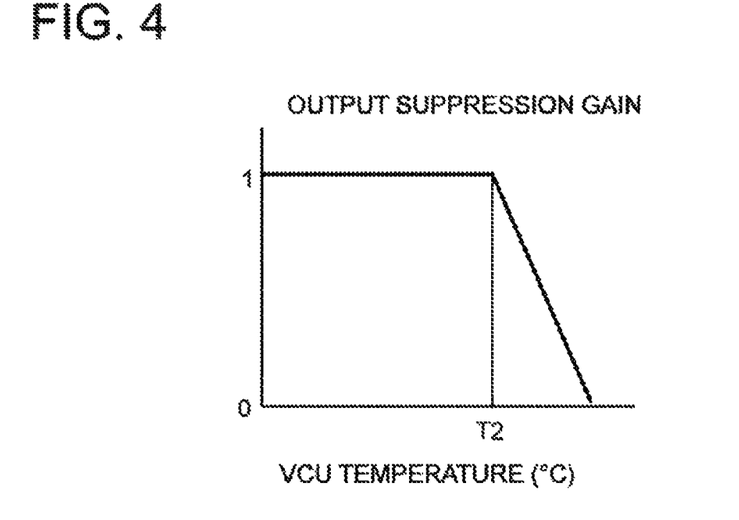
FIG. 4 is a diagram for explaining an output suppression gain.

Specifically, the output suppression control unit 48 suppresses the output of the VCU 43 on the basis of an output suppression gain (see FIG. 4) stored in the ROM. The output suppression gain is set in relation to the temperature of the VCU 43, so that the output suppression gain decreases with an increase in the temperature of the VCU 43 when the temperature of the VCU 43 is at or above the output suppression temperature T2, as illustrated in FIG. 4. In this way, when the temperature of the VCU 43 is at or above the output suppression temperature T2, the output of the VCU 43 decreases with an increase in the temperature of the VCU 43.

The rear motor control unit 6 is a controller for controlling the rear motor 18, and includes a CPU (not illustrated) that executes various computing processes, an ROM (not illustrated) storing programs and data required to control the CPU, a RAM temporarily storing the computation result of the CPU, and input-output ports (not illustrated) for inputting and outputting signals with respect to outside, as well as a rear motor control unit 61 (hereinafter, referred to as RMCU 61) that controls the rear motor 18.

Similarly to the GCU 41 and the FMCU 42, the RMCU 61 has the function of a power converter including a power circuit that electrically generates (inverts) AC from DC, and converts DC stored in the high-voltage battery 11 into AC to supply the AC to the rear motor 18, while converting AC recovered by the rear motor 18 into DC to supply the DC to the high-voltage battery 11.

The rear motor control unit 6, i.e., the CPU, the ROM, and the RAM constitute a control unit, and perform a centralized control on the RMCU 61.

When the electric vehicle 1 according to the present embodiment runs in the EV mode, electric power (driving force) is distributed from the high-voltage battery 11 to the front motor 16 and the rear motor 18 at a predetermined ratio (e.g. 50:50). The electric power distributed to the front motor 16 has its voltage increased from the battery voltage of the high-voltage battery 11 to the generation voltage of the generator 12 by the VCU 43, and is supplied to the front motor 16. In this way, the front motor 16 is driven by electric power of a voltage (generation voltage) higher than the battery voltage of the high-voltage battery 11, and the rear motor 18 is driven by electric power maintained to have the battery voltage of the high-voltage battery 11.

Further, when the electric vehicle 1 runs in the parallel mode, the engine 20 starts. Then, when a large output is required, such as when the electric vehicle I is overtaking, the front motor 16 and the rear motor 18 are activated, and the travel by the engine 20 is assisted by the front motor 16 and the rear motor 18.

Further, when the electric vehicle 1 runs in the series mode, electric power (driving force) is distributed from the generator 12 to the front motor 16 and the rear motor 18 at a predetermined ratio (e.g. 50:50). The electric power distributed to the rear motor 18 has its voltage decreased from the generation voltage of the generator 12 to the battery voltage of the high-voltage battery 11 by the VCU 43, and is supplied to the rear motor 18. In this way, the front motor 16 is driven by electric power of the generation voltage, and the rear motor 18 is driven by electric power of a voltage (battery voltage) lower than the generation voltage of the generator 12.

Figure 5:
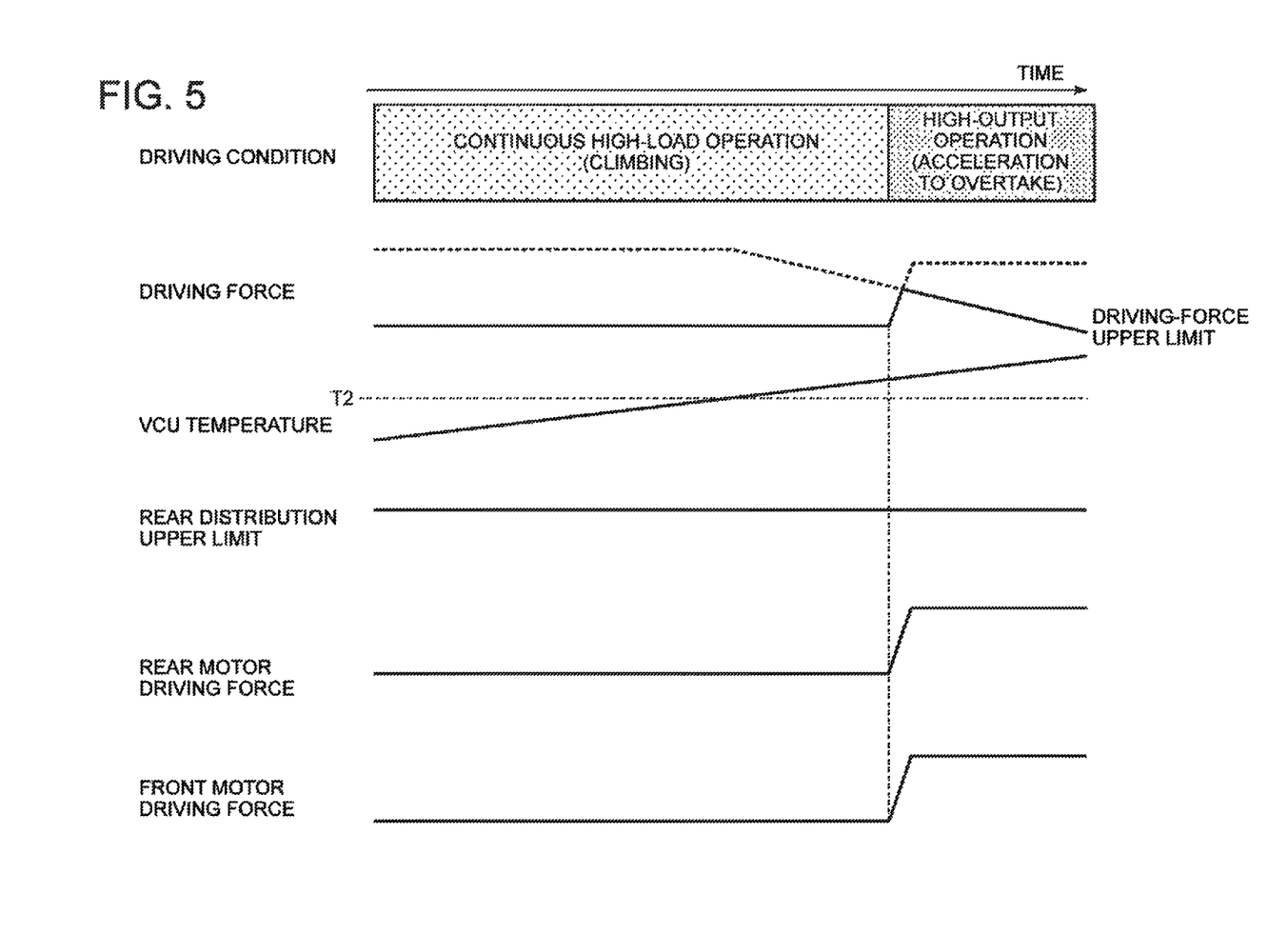
FIG. 5 is a time chart showing a control in a case where a comparative electric vehicle is in continuous high-load operation under a series mode.
Figure 6:
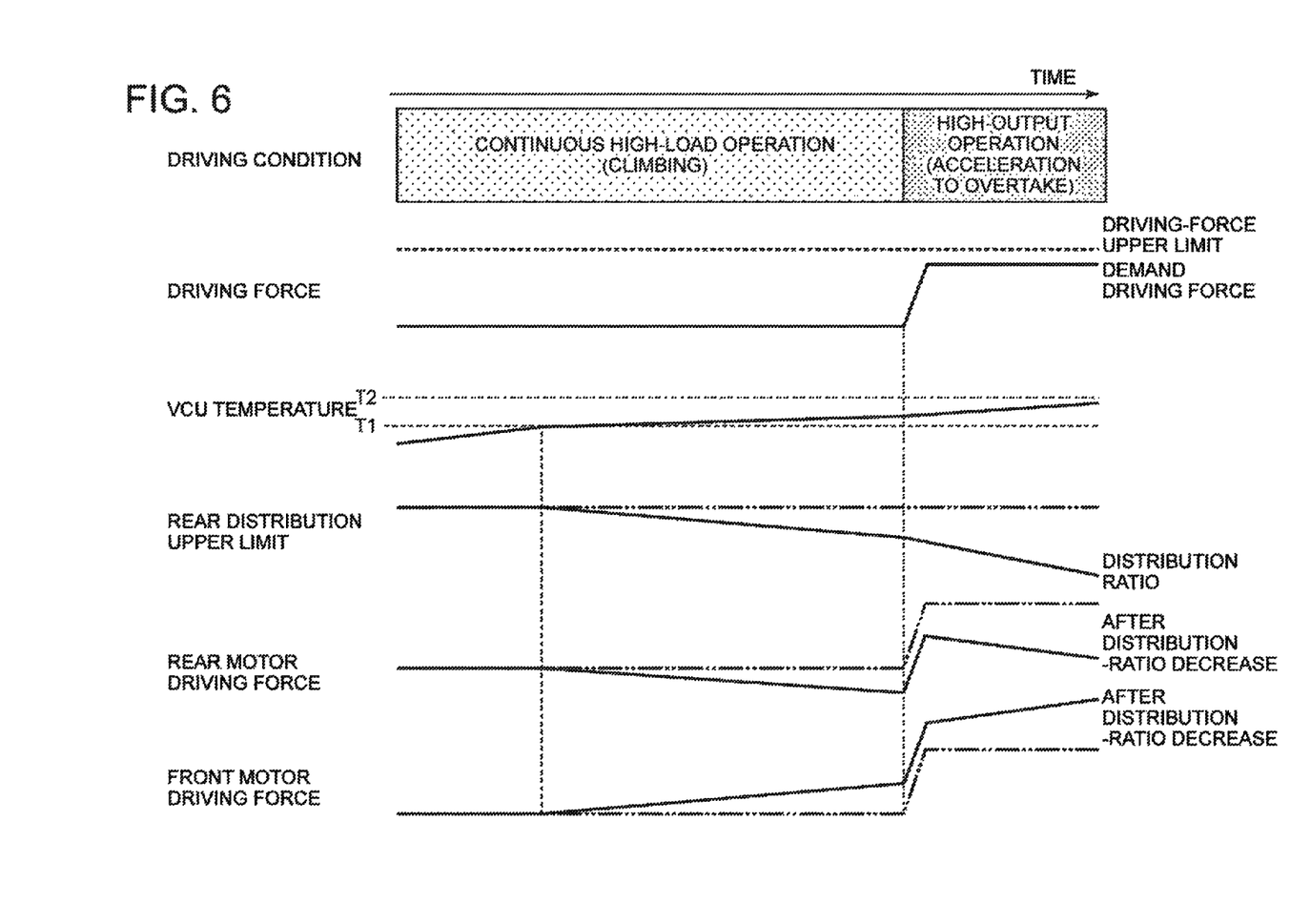
FIG. 6 is a time chart showing a control in a case where the electric vehicle illustrated in FIG. 1 is in continuous high-load operation under a series mode.

FIG. 5 is a time chart showing a control in a case where a comparative electric vehicle is in the continuous high-load operation under the series mode, and FIG. 6 is a time chart showing a control in a case where the electric vehicle 1 illustrated in FIG. 1 is in the continuous high-load operation under the series mode. The electric vehicle used for comparison here is such that the distribution ratio of electric power (driving force) to be distributed to the rear motor 18 (the second electric motor 14) is constant, and the distribution ratio cannot be reduced.

As illustrated in FIG. 5, if the comparative electric vehicle is maintained to be in continuous high-load operation under the series mode as in a situation where the electric vehicle is climbing, the temperature of the VCU 43 increases. Eventually, the temperature of the VCU 43 reaches the output suppression temperature T2 or higher, and if the output suppression temperature determination unit 47 determines that the temperature is at the output suppression temperature T2 or higher, the output suppression control unit 48 suppresses the output of the VCU 43.

Specifically, the output suppression gain (see FIG. 4) stored in the ROM is set, and the output of the VCU 43 is suppressed on the basis of the output suppression gain. In this way, when the temperature of the VCU 43 is at or above the output suppression temperature T2, the higher the temperature of the VCU 43 is, the more the output of the VCU 43 is suppressed. As a result, the output from the VCU 43 to the rear motor 18 is suppressed.

Specifically, when the temperature of the VCU 43 reaches the output suppression temperature T2 or higher, the total driving force of the front motor 16 and the rear motor 18 is suppressed on the basis of the output suppression gain, and the driving force according to the demand of a driver may not be obtained when high-output operation is required, such as when the electric vehicle 1 accelerates to overtake. Accordingly, it is difficult for the comparative electric vehicle to accelerate to overtake after having climbed a slope continuously.

In contrast, as illustrated in FIG. 6, if the electric vehicle 1 illustrated in FIG. 1 is maintained to be in the continuous high-load operation in the series mode as in a situation where the electric vehicle 1 is climbing, the temperature of the VCU 43 increases, and eventually the temperature of the VCU 43 reaches the distribution-ratio decrease temperature T1 or higher. Then, if the distribution-ratio decrease temperature determination unit 45 determines that the temperature of the VCU 43 has increased to reach the distribution-ratio decrease temperature T1 or higher, the distribution-ratio control unit 46 reduces the distribution ratio of electric power (driving force) to be distributed to the rear motor 18 (the second electric motor 14).

Specifically, the distribution suppression gain (see FIG. 3) stored in the ROM is set, and the distribution-ratio control unit 46 reduces the distribution ratio of electric power to be distributed to the rear motor 18 on the basis of the distribution suppression gain (distribution decrease). In this way, when the temperature of the VCU 43 is at or above the distribution-ratio decrease temperature T1, the distribution ratio of electric power to be distributed to the rear motor 18 decreases with an increase in the temperature of the VCU 43.

As illustrated in FIG. 6, if the distribution ratio of electric power to be distributed to the rear motor 18 decreases, the driving force of the front motor 16 increases, and the driving force of the rear motor 18 decreases. Thus, even when the electric vehicle 1 accelerates to overtake during climbing, there is a margin in the driving forces of the front motor 16 and the rear motor 18, and thus the operation of the electric vehicle 1 can be switched from continuous high-load operation to high-output operation. In this way, it becomes easier for the electric vehicle 1 to accelerate to overtake after having climbed a slope continuously.

If the high-output operation is continued, the temperature of the VCU 43 eventually increases to the output suppression temperature T2 or higher. If the output suppression temperature determination unit 47 determines that the temperature of the VCU 43 is at the output suppression temperature T2 or higher, the output suppression control unit 48 suppresses the output of the VCU 43.

Specifically, the output suppression gain (see FIG. 4) stored in the ROM is set, and the output of the VCU 43 is suppressed on the basis of the output suppression gain. In this way, when the temperature of the VCU 43 is at or above the output suppression temperature T2, the higher the temperature of the VCU 43 is the more the output of the VCU 43 is suppressed. As a result, the output from the VCU 43 to the rear motor 18 is suppressed. In this way, excessive supply of electric power to the VCU 43 is prevented, which makes it possible to protect the VCU 43 from malfunction due to heating.

As described above, the electric vehicle 1 according to the present embodiment is configured such that the front motor 16 is driven by electric power of a voltage higher than the battery voltage of the high-voltage battery 11, and the rear motor 18 is driven by electric power maintained to have the battery voltage of the high-voltage battery 11. Thus, it is possible to drive the electric vehicle 1 efficiently and safely.

Further, the power drive unit 4 reduces the distribution ratio of electric power to be distributed to the rear motor 18 (the second electric motor) from the generator 12 if it is determined that the temperature of the VCU 43 has increased to reach the distribution-ratio decrease temperature T1 or higher. Thus, electric power flowing through the VCU 43 decreases. In this way, the temperature of the VCU 43 is restricted to the upper limit temperature of the VCU 43 or lower, and it is possible to suppress a decrease in the vehicle performance.

Further, the distribution-ratio decrease temperature determination unit 45 is capable of determining that the temperature of the VCU 43 has increased to reach the distribution-ratio decrease temperature T1 or higher if the integrated value of electric current having flowed through the VCU 43 has increased to a distribution-ratio decrease electric-current value or higher within a monitoring period, even in a case where it is difficult to measure the temperature of the VCU 43.

Similarly, the output suppression temperature determination unit 47 is capable of determining that the temperature of the VCU 43 has increased to reach the output suppression temperature T2 or higher if the integrated value of electric current having flown through the VCU 43 has increased to an output suppression electric-current value or higher within a monitoring period, even in a case where it is difficult to measure the temperature of the VCU 43.

Further, when the temperature of the VCU 43 is at or above the distribution-ratio decrease temperature T1, the higher the temperature of the VCU 43 is the more the distribution-ratio control unit 46 reduces the distribution ratio of electric power to be distributed to the rear motor 18. In this way, the temperature of the VCU 43 is restricted efficiently, and it is possible to suppress a decrease in the vehicle performance efficiently.

Further, the distribution-ratio control unit 46 sets the distribution suppression gain (see FIG. 3) and reduces the distribution ratio of electric power to be distributed to the rear motor 18 on the basis of the distribution suppression gain. Thus, the temperature of the VCU 43 is efficiently suppressed by a relatively simple control, which makes it possible to suppress a decrease in the vehicle performance efficiently.

Further, the output suppression control unit 48 suppresses the output of the VCU 43 if the temperature of the VCU 43 has increased to reach the output suppression temperature T2 or higher, the output suppression temperature T2 being higher than the distribution-ratio decrease temperature T1. Thus, it is possible to protect the VCU 43 from malfunction due to overheat.

Further, the output suppression control unit 48 sets the output suppression gain (see FIG. 4) and reduces the output of the VCU 43 on the basis of the output suppression gain. Thus, the temperature of the VCU 43 is efficiently suppressed by a relatively simple control, which makes it possible to protect the VCU 43 from malfunction due to overheat efficiently.

INDUSTRIAL APPLICABILITY

As described above, according to the present invention, the temperature of a transformer is restricted to an upper limit temperature of the transformer or lower, which makes it possible to suppress a decrease in the vehicle performance. Thus, the present invention can be suitably applied to an electric vehicle of four-wheel drive including the first electric motor driven by electric power of a voltage higher than the battery voltage of a high-voltage battery, and the second electric motor driven by the electric power of the battery voltage of the high-voltage battery.

The invention claimed is:
1. An electric vehicle comprising:
  a battery for storing electric power for driving the electric vehicle;
  a generator for generating electric power having a voltage higher than a battery voltage of the battery;
  a first electric motor driven by electric power having a generation voltage of the generator;

a second electric motor driven by electric power having the battery voltage of the battery;

a transformer for reducing a voltage of a part of the electric power generated by the generator which is to be distributed to the battery from the generation voltage of the generator to the battery voltage of the battery;

a temperature determination unit for determining a temperature of the transformer; and a first control unit for reducing a distribution ratio of the electric power to be distributed to the second electric motor via the battery from the generator if the temperature determination unit determines that the temperature of the transformer has increased to reach a first predetermined temperature or higher.

2. The electric vehicle according to claim 1,
wherein, the higher the temperature determination unit determines the temperature of the transformer to be, the more the first control unit reduces the distribution ratio of the electric power to be distributed to the second electric motor.

3. The electric vehicle according to claim 2,
wherein the first control unit is configured to set a distribution suppression gain of an electric motor related to the temperature of the transformer, and decrease the distribution ratio of the electric power to be distributed to the second electric motor on the basis of the distribution suppression gain.

4. The electric vehicle according to claim 2, further comprising
a second control unit for suppressing an output of the transformer if the temperature determination unit determines that the temperature of the transformer has increased to reach a second predetermined temperature or higher, the second predetermined temperature being higher than the first predetermined temperature.

5. The electric vehicle according to claim 4,
wherein, the higher the temperature determination unit determines the temperature of the transformer to be, the more the second control unit suppresses the output of the transformer.

6. The electric vehicle according to claim 5,
wherein the first control unit is configured to increase the distribution ratio of the electric power to be distributed to the first electric motor in a case where the distribution ratio of the electric power to be distributed to the second electric motor is to be reduced.

7. The electric vehicle according to claim 4,
wherein the first control unit is configured to increase the distribution ratio of the electric power to be distributed to the first electric motor in a case where the distribution ratio of the electric power to be distributed to the second electric motor is to be reduced.

8. The electric vehicle according to claim 2,
wherein the first control unit is configured to increase the distribution ratio of the electric power to be distributed to the first electric motor in a case where the distribution ratio of the electric power to be distributed to the second electric motor is to be reduced.

9. The electric vehicle according to claim 1, further comprising
a second control unit for suppressing an output of the transformer if the temperature determination unit determines that the temperature of the transformer has increased to reach a second predetermined temperature or higher, the second predetermined temperature being higher than the first predetermined temperature.

10. The electric vehicle according to claim 9,
wherein, the higher the temperature determination unit determines the temperature of the transformer to be, the more the second control unit suppresses the output of the transformer.

11. The electric vehicle according to claim 9,
wherein the first control unit is configured to increase the distribution ratio of the electric power to be distributed to the first electric motor in a case where the distribution ratio of the electric power to be distributed to the second electric motor is to be reduced.

12. The electric vehicle according to claim 10,
wherein the second control unit is configured to set an output suppression gain of the transformer related to the temperature of the transformer, and suppress the output of the transformer on the basis of the output suppression gain.

13. The electric vehicle according to claim 10,
wherein the first control unit is configured to increase the distribution ratio of the electric power to be distributed to the first electric motor in a case where the distribution ratio of the electric power to be distributed to the second electric motor is to be reduced.

14. The electric vehicle according to claim 1,
wherein the first control unit is configured to increase the distribution ratio of the electric power to be distributed to the first electric motor in a case where the distribution ratio of the electric power to be distributed to the second electric motor is to be reduced.

15. The electric vehicle according to claim 1,
wherein the first electric motor is a front motor for driving front wheels, and the second electric motor is a rear motor for driving rear wheels.

16. The electric vehicle according to claim 1,
wherein the temperature determination unit is configured to determine the temperature of the transformer on the basis of a detected temperature of the transformer or an integrated value of electric current having flown through the transformer.

* * * * *